(12) United States Patent
Takahashi et al.

(10) Patent No.: US 8,668,838 B2
(45) Date of Patent: Mar. 11, 2014

(54) ELECTRICAL DOUBLE LAYER CAPACITOR

(75) Inventors: Kenzou Takahashi, Sakai (JP); Meiten Koh, Settsu (JP); Mai Koyama, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 197 days.

(21) Appl. No.: 13/129,212

(22) PCT Filed: Oct. 26, 2009

(86) PCT No.: PCT/JP2009/068328
§ 371 (c)(1),
(2), (4) Date: May 13, 2011

(87) PCT Pub. No.: WO2010/055762
PCT Pub. Date: May 20, 2010

(65) Prior Publication Data
US 2011/0216477 A1    Sep. 8, 2011

(30) Foreign Application Priority Data
Nov. 14, 2008 (JP) ................................ 2008-292500

(51) Int. Cl.
*H01G 9/038* (2006.01)

(52) U.S. Cl.
USPC ........................... 252/62.2; 361/502; 361/504

(58) Field of Classification Search
USPC ................................. 252/62.2; 361/502, 504
See application file for complete search history.

(56) References Cited

U.S. PATENT DOCUMENTS

| | | | | |
|---|---|---|---|---|
| 5,969,936 A * | 10/1999 | Kawasato et al. | ............ | 361/502 |
| 6,495,293 B1 * | 12/2002 | Arai et al. | ..................... | 429/307 |
| 8,007,679 B2 * | 8/2011 | Koh et al. | .................... | 252/62.2 |
| 8,329,344 B2 * | 12/2012 | Koh et al. | ..................... | 429/342 |
| 8,343,374 B2 * | 1/2013 | Koh et al. | .................... | 252/62.2 |

FOREIGN PATENT DOCUMENTS

| | | | |
|---|---|---|---|
| CN | 101584075 | * | 11/2009 |
| CN | 101584075 A | | 11/2009 |
| JP | 2000-208372 A | | 7/2000 |
| JP | 2001-143750 A | | 5/2001 |
| WO | WO 2006/088009 | * | 8/2006 |
| WO | WO 2006/106656 | * | 12/2006 |
| WO | WO 2006/106657 | * | 12/2006 |
| WO | 2008/078626 A1 | | 7/2008 |
| WO | WO 2008/078626 | * | 7/2008 |

\* cited by examiner

*Primary Examiner* — Carol M Koslow
(74) *Attorney, Agent, or Firm* — Sughrue Mion, PLLC

(57) ABSTRACT

The present invention provides an electric double layer capacitor that has a high withstand voltage, is more resistant to degradation, and also has good cycle characteristics. The present invention relates to an electrolytic solution for an electric double layer capacitor, comprising: (I) a solvent for dissolving an electrolyte salt; and (II) an electrolyte salt, wherein the solvent (I) for dissolving an electrolyte salt includes propylene carbonate and at least one selected from the group consisting of a fluorine-containing chain carbonate and a fluorine-containing chain ether. The present invention also relates to an electric double layer capacitor comprising the electrolytic solution.

2 Claims, No Drawings

ELECTRICAL DOUBLE LAYER CAPACITOR

CROSS REFERENCE TO RELATED APPLICATIONS

This application is a National Stage of International Application No. PCT/JP2009/068328 filed Oct. 26, 2009, claiming priority based on Japanese Patent Application No. 2008-292500, filed Nov. 14, 2008, the contents of all of which are incorporated herein by reference in their entirety.

TECHNICAL FIELD

The present invention relates to an electrolytic solution for an electric double layer capacitor and an electric double layer capacitor comprising the electrolytic solution.

BACKGROUND ART

Solvents for dissolving an electrolyte salt for use in an electric double layer capacitor including at least one polarizable electrode as a positive electrode and/or a negative electrode should be stable when used at a withstand voltage of not lower than 3 V. To that end, use in combination of ethylene carbonate and propylene carbonate, which is a cyclic carbonate with a high oxidation potential (a high withstand voltage), has been proposed (Patent Document 1).
Patent Document 1: JP-A 2000-208372

DISCLOSURE OF INVENTION

Problems which the Invention is to Solve

Such conventional techniques, however, cannot always provide a good balance of characteristics required for electric double layer capacitors, specifically high withstand voltage and long lifetime.
An object of the present invention is to provide an electric double layer capacitor that has a high withstand voltage and is more resistant to degradation.

Means for Solving the Problems

The present inventors found that the above problem can be solved by using, for a solvent for dissolving an electrolyte salt for an electric double layer capacitor, a fluorine-containing chain carbonate or ether solvent together with, as a base material, propylene carbonate that has been widely used because of its high solvency for electrolyte salts and low viscosity, and thereby completed the present invention.

Specifically, the present invention relates to an electrolytic solution for an electric double layer capacitor, comprising: (I) a solvent for dissolving an electrolyte salt; and (II) an electrolyte salt, wherein the solvent (I) for dissolving an electrolyte salt includes propylene carbonate and at least one selected from the group consisting of a fluorine-containing chain carbonate and a fluorine-containing chain ether.

The fluorine-containing chain carbonate is preferably $CH_3OCOOCH_2CF_3$ and/or $CF_3CF_2CH_2OCOOCH_2CF_2CF_2H$. The fluorine-containing chain ether is preferably $HCF_2CF_2CH_2OCF_2CF_2H$.

The volume ratio of the propylene carbonate to the fluorine-containing chain carbonate and/or the fluorine-containing chain ether is 5/95 to 95/5, preferably 30/70 to 70/30.

The electrolyte salt (II) is preferably a tetraalkyl ammonium salt, a spiro-bipyrrolidinium salt, or an imidazolium salt.

The present invention also relates to an electric double layer capacitor comprising the electrolytic solution of the present invention.

Effects of the Invention

The present invention can provide an electric double layer capacitor that has a long lifetime (improved cycle characteristics) and has a large capacitance (a high withstand voltage).

BEST MODES FOR CARRYING OUT THE INVENTION

The electrolytic solution for an electric double layer capacitor of the present invention contains: (I) a specific mixed solvent for dissolving an electrolyte salt; and (II) an electrolyte salt.

The specific mixed solvent for dissolving an electrolyte salt used in the present invention contains propylene carbonate and at least one of: (Ia) a fluorine-containing chain carbonate and (Ib) a fluorine-containing chain ether.

Examples of the fluorine-containing chain carbonate (Ia) include the following chain carbonates:

chain carbonates represented by the formula (Ia1):

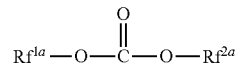

wherein $Rf^{1a}$ represents an alkyl group, preferably a $C_{1-3}$ alkyl group, or represents a fluoroalkyl group containing a moiety at the end and preferably having a fluorine content of 10 to 76% by mass, the moiety being represented by the formula:

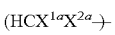

$(HCX^{1a}X^{2a})\!\!-$ wherein $X^{1a}$ and $X^{2a}$ may be the same as or different from each other and each represent H or F, and
$Rf^{2a}$ represents a fluoroalkyl group containing a moiety represented by the above formula or $-CF_3$ at the end and preferably having a fluorine content of 10 to 76% by mass;

chain carbonates represented by the formula (Ia2):

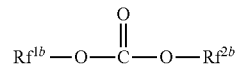

wherein $Rf^{1b}$ represents a fluorine-containing ether group containing $-CF_3$ at the end and having a fluorine content of 10 to 76% by mass, and $Rf^{2b}$ represents a fluorine-containing ether or alkyl group having a fluorine content of 10 to 76% by mass; and chain carbonates represented by the formula (Ia3):

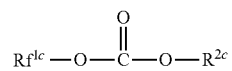

wherein $Rf^{1c}$ represents a fluorine-containing ether group having a fluorine content of 10 to 76% by mass and containing, at the end, a moiety represented by the formula:

$HCFX^{1c}\!\!-$ wherein $X^{1c}$ represents H or F, and
$R^{2c}$ represents an alkyl group in which a hydrogen atom may be substituted with a halogen atom and a hetero atom may be contained in its chain.

Among these, the fluorine-containing chain carbonates represented by the formula (Ia1) are preferable.

Specifically, preferred examples of usable fluorine-containing chain carbonates (Ia) include chain carbonates represented by the formula:

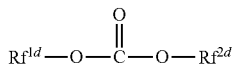

wherein $Rf^{1d}$ and $Rf^{2d}$ are each selected from fluorine-containing groups such as $H(CF_2)_2CH_2-$, $FCH_2CF_2CH_2-$, $H(CF_2)_2CH_2CH_2-$, $CF_3CH_2-$, $CF_3CF_2CH_2-$, $CF_3CH_2CH_2-$, $CF_3CF(CF_3)CH_2CH_2-$, $C_3F_7OCF(CF_3)CH_2-$, $CF_3OCF(CF_3)CH_2-$, and $CF_3OCF_2-$.

Among these chain carbonates, in terms of good compatibility with propylene carbonate, the following chain carbonates are preferable.

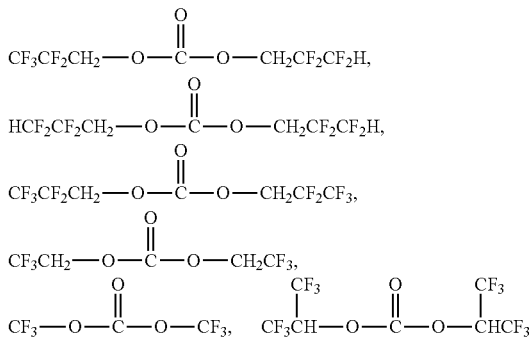

Other examples of the fluorine-containing chain carbonate (Ia) include the following compounds.

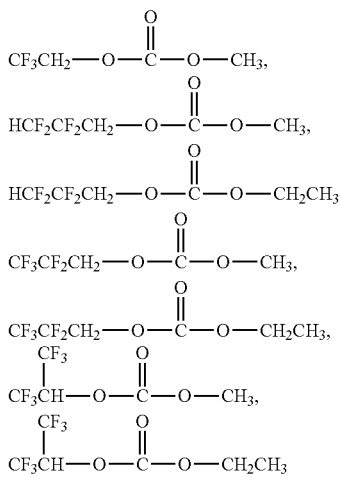

The amount of the fluorine-containing chain carbonate (Ia) added to propylene carbonate (PC) depends on factors such as the kind of the fluorine-containing chain carbonate, the required electrical characteristics, and the kind of the electrolyte salt. In general, the volume ratio (PC)/(Ia) is preferably 5/95 to 95/5, more preferably 20/80 to 80/20, and particularly preferably 30/70 to 70/30.

Examples of the fluorine-containing chain ether (Ib) include compounds disclosed in, for example, JP-A H08-37024, JP-A H09-97627, JP-A H11-26015, JP-A 2000-294281, JP-A 2001-52737, and JP-A H11-307123.

In particular, preferred are fluorine-containing chain ethers represented by the formula (Ib):

wherein $Rf^{1e}$ represents a $C_{3-6}$ fluoroalkyl group; and $Rf^{2e}$ represents a $C_{2-6}$ fluoroalkyl group. This is because these ethers are highly compatible with propylene carbonate and have an appropriate boiling point.

Specific examples of $C_{3-6}$ fluoroalkyl groups for $Rf^{1e}$ include $HCF_2CF_2CH_2-$, $HCF_2CF_2CF_2CH_2-$, $HCF_2CF_2CF_2CF_2CH_2-$, $C_2F_5CH_2-$, $CF_3CFHCF_2CH_2-$, $HCF_2CF(CF_3)CH_2-$, $C_2F_5CH_2CH_2-$, and $CF_3CH_2CH_2-$. Specific examples of $C_{2-6}$ fluoroalkyl groups for $Rf^{2e}$ include $-CF_2CF_2H$, $-CF_2CFHCF_3$, $-CF_2CF_2CF_2H$, $-CH_2CH_2CF_3$, $-CH_2CFHCF_3$, and $-CH_2CH_2C_2F_5$. Especially, compounds that contain a $C_{3-4}$ fluoroalkyl group at $Rf^{1e}$ and a $C_{2-3}$ fluoroalkyl group at $Rf^{2e}$ are particularly preferable because of their high ionic conductivity.

Further, preferred are fluorine-containing chain ethers represented by the formula (Ib1):

wherein $Rf^3$ represents a $C_{2-5}$ fluoroalkyl group; and $Rf^4$ represents a $C_{1-5}$ fluoroalkyl group. This is because of their high ionic conductivity, good solvency for salts, and good low-temperature characteristics.

A specific example of the fluorine-containing chain ether (Ib) is one or more of the following ethers: $HCF_2CF_2CH_2OCF_2CF_2H$, $C_2F_5CH_2OCF_2CF_2H$, $HCF_2CF_2CH_2OCF_2CFHCF_3$, $C_2F_5CH_2OCF_2CFHCF_3$, $HCF_2CF_2CH_2OCH_2CFHCF_3$, $C_2F_5CH_2OCH_2CFHCF_3$, and the like. Among these, $HCF_2CF_2CH_2OCF_2CF_2H$, $C_2F_5CH_2OCF_2CF_2H$, $HCF_2CF_2CH_2OCF_2CFHCF_3$, and $C_2F_5CH_2OCF_2CFHCF_3$ are particularly preferable because of their good compatibility with propylene carbonate and good cycle characteristics.

The amount of the fluorine-containing chain ether (Ib) added to propylene carbonate (PC) depends on factors such as the kind of the fluorine-containing chain ether, the required electrical characteristics, and the kind of the electrolyte salt. In general, the volume ratio (PC)/(Ib) is preferably 5/95 to 95/5, more preferably 20/80 to 80/20, and particularly preferably 30/70 to 70/30.

The solvent (I) for dissolving an electrolyte salt used in an electric double layer capacitor in the present invention may optionally include other solvents listed below although even only the combination of propylene carbonate and the fluorine-containing chain carbonate (Ia) and/or the fluorine-containing chain ether (Ib) can enhance the withstand voltage and improve the cycle characteristics (inhibit degradation of the electrolytic solution).

Examples of usable other solvents (III) include fluorine-containing solvents such as fluorine-containing cyclic carbonates such as those represented by the formulae:

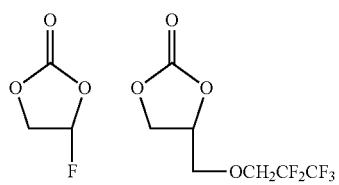

-continued

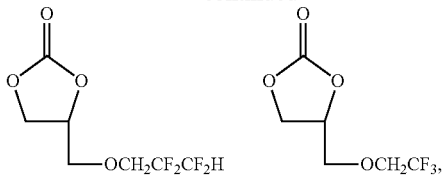

fluorine-containing cyclic ethers such as those represented by the formulae:

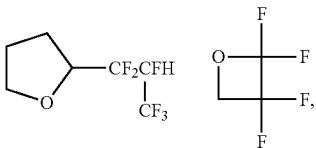

fluorine-containing lactones such as those represented by the formulae:

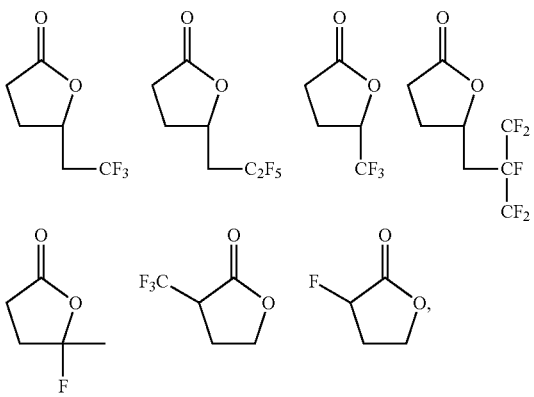

and
fluorine-containing esters such as those represented by the formulae:

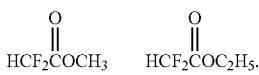

Other examples thereof include non-fluorine-containing cyclic carbonates except propylene carbonate (e.g. ethylene carbonate, vinylene carbonate); non-fluorine-containing chain carbonates (e.g. ethyl methyl carbonate, diethyl carbonate); and solvents conventionally used as solvents for dissolving an electrolyte salt, such as non-fluorine-containing ester solvents, nitrile solvents, furans, and oxolans.

The amount of other solvents (III) added is not more than 30% by volume, and is preferably not more than 5% by volume. Alternatively, the solvent (I) may not include other solvents.

In the following, the electrolyte salt (II), which is another component of the electrolytic solution of the present invention, is described.

Examples of the electrolyte salt (II) usable in the present invention include liquid salts (ionic liquids), inorganic polymer salts, and organic polymer salts, in addition to conventionally known ammonium salts and metallic salts.

Some compounds of these electrolyte salts are particularly suitable for certain applications of the electrolytic solution. For capacitors, ammonium salts are suitable as electrolyte salts. It should be noted that the electrolyte salt is not limited to the salts specifically listed including ammonium salts. For applications other than capacitors, known electrolyte salts for such applications can be appropriately used.

Preferred examples of ammonium salts suitable as electrolyte salts for capacitors include the following compounds.

(IIA) Tetraalkyl Quaternary Ammonium Salts

Preferred examples of tetraalkyl quaternary ammonium salts include those represented by the formula (IIA):

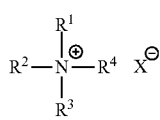

wherein $R^1$, $R^2$, $R^3$ and $R^4$ may be the same as or different from each other and each represent a $C_{1-6}$ alkyl group optionally containing an ether bond; and X represents an anion. A part of or all of the hydrogen atoms of these ammonium salts may be substituted with fluorine atoms and/or $C_{1-4}$ fluoroalkyl groups, and such salts are also preferred because of their improved oxidation resistance.

Specific examples thereof include tetraalkyl quaternary ammonium salts represented by the formula (IIA-1):

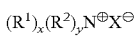

wherein $R^1$, $R^2$ and X are defined as above, x and y may be the same as or different from each other, each represent an integer of 0 to 4, and satisfy the equation: x+y=4; and alkyl ether group-containing trialkyl ammonium salts represented by the formula (IIA-2):

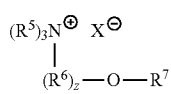

wherein $R^5$ represents a $C_{1-6}$ alkyl group, $R^6$ represents a $C_{1-6}$ divalent hydrocarbon group, $R^7$ represents a $C_{1-4}$ alkyl group, z represents 1 or 2, and X represents an anion. Introduction of an alkyl ether group makes it possible to reduce the viscosity.

The anion $X^-$ may be an inorganic anion or an organic anion. Examples of the inorganic anion include $AlCl_4^-$, $BF_4^-$, $PF_6^-$, $AsF_6^-$, $TaF_6^-$, $I^-$, and $SbF_6^-$. Examples of the organic anion include $CF_3COO^-$, $CF_3SO_3^-$, $(CF_3SO_2)_2N^-$, and $(C_2F_5SO_2)_2N^-$.

Among these, $BF_4^-$, $PF_6^-$, $AsF_6^-$, and $SbF_6^-$ are preferable because they have good oxidation resistance and tend to be readily dissociated.

Specifically, preferred examples of tetraalkyl quaternary ammonium salts may include $Et_3MeNBF_4$, $Et_3MeNClO_4$, $Et_3MeNPF_6$, $Et_3MeNAsF_6$, $Et_3MeNSbF_6$, $Et_3MeNCF_3SO_3$, $Et_3MeN(CF_3SO_2)_2N$, and $Et_3MeNC_4F_9SO_3$. In particular, preferred examples include $Et_4NBF_4$, $Et_4NPF_6$, $Et_4NSbF_6$, $Et_4NAsF_6$, $Et_3MeNBF_4$, and N,N-diethyl-N-methyl-N-(2-methoxyethyl)ammonium salts. Among these, triethyl methyl ammonium salts and tetraethyl ammonium salts are preferable.

(IIB) Spiro Bipyridinium Spiro-Bipyrrolidinium Salts

Preferred examples of spiro-bipyrrolidinium salts include those represented by the formula (IIB):

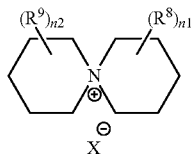

wherein $R^8$ and $R^9$ may be the same as or different from each other and each represent a $C_{1-4}$ alkyl group, X represents an anion, n1 represents an integer of 0 to 5, and n2 represents an integer of 0 to 5. A part of or all of the hydrogen atoms of these spiro-bipyrrolidinium salts may be substituted with fluorine atoms and/or $C_{1-4}$ fluoroalkyl groups, and such salts are also preferred because of their improved oxidation resistance.

Specific preferred examples of the anion $X^-$ are the same as those listed above for (IIA).

Specifically, preferred examples of spiro-bipyrrolidinium salts include those represented by the following formula.

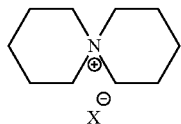

These spiro-bipyrrolidinium salts are excellent in solubility, oxidation resistance, and ionic conductivity.

(IIC): Imidazolium Salts

Preferred examples of imidazolium salts include those represented by the formula (IIC):

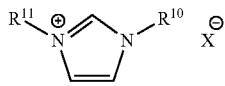

wherein $R^{10}$ and $R^{11}$ may be the same as or different from each other and each represent a $C_{1-6}$ alkyl group; and X represents an anion. A part of or all of the hydrogen atoms of these imidazolium salts may be substituted with fluorine atoms and/or $C_{1-4}$ fluoroalkyl groups, and such salts are also preferred because of their improved oxidation resistance.

Specific preferred examples of the anion $X^-$ are the same as those listed above for (IIA).

Specifically, preferred examples of imidazolium salts include ethyl methyl imidazolium salts represented by the following formula.

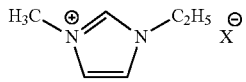

These imidazolium salts are useful because of their low viscosity and good solubility.

(IID): N-Alkylpyridinium Salts

Preferred examples of N-alkylpyridinium salts include those represented by the formula (IID):

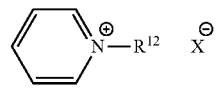

wherein $R^{12}$ represents a $C_{1-6}$ alkyl group; and X represents an anion. A part of or all of the hydrogen atoms of these N-alkylpyridinium salts may be substituted with fluorine atoms and/or $C_{1-4}$ fluoroalkyl groups, and such salts are also preferred because of their improved oxidation resistance.

Specific preferred examples of the anion $X^-$ are the same as those listed above for (IIA).

Specifically, preferred examples of N-alkylpyridinium salts include those represented by the following formulae.

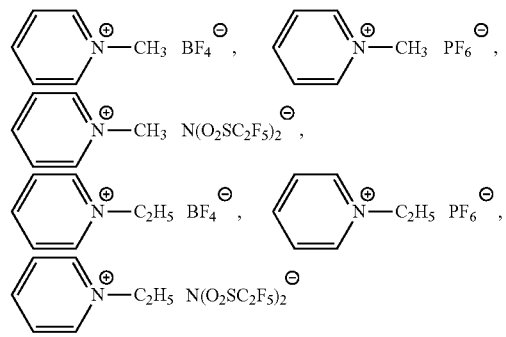

These N-alkylpyridinium salts are useful because of their low viscosity and good solubility.

(IIE) N,N-Dialkylpyrrolidinium Salts

Preferred examples of N,N-dialkylpyrrolidinium salts include those represented by the formula:

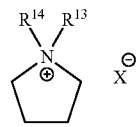

wherein $R^{13}$ and $R^{14}$ may be the same as or different from each other and each represent a $C_{1-6}$ alkyl group; and X represents an anion. A part of or all of the hydrogen atoms of these N,N-dialkylpyrrolidinium salts may be substituted with fluorine atoms and/or $C_{1-4}$ fluoroalkyl groups, and such salts are also preferred because of their improved oxidation resistance.

Specific preferred examples of the anion $X^-$ are the same as those listed above for (IIA).

Specifically, preferred examples of N,N-dialkylpyrrolidinium salts include those represented by the following formulae.

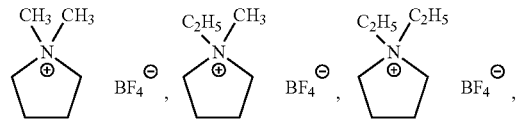

-continued

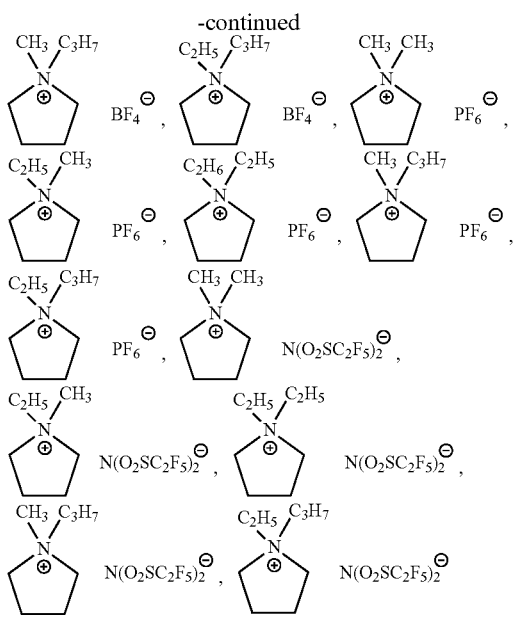

These N,N-dialkylpyrrolidinium salts are useful because of their low viscosity and good solubility.

Among these ammonium salts, the ammonium salts (IIA), (IIB), and (IIC) are preferable because of their good solubility, good oxidation resistance, and high ionic conductivity. Further, the following salts are preferable.

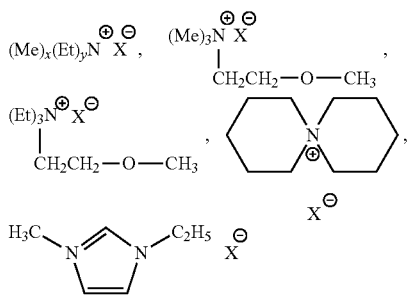

In the formulae, Me is a methyl group; Et is an ethyl group; and X, x and y are as defined for the formula (IIA-1).

Alternatively, the electrolyte salt may be a lithium salt. Preferred examples of the lithium salt include $LiPF_6$, $LiBF_4$, $LiAsF_6$, $LiSbF_6$, and $LiN(SO_2C_2H_5)_2$.

In order to increase capacitance, a magnesium salt may be used. Preferred examples of the magnesium salt include $Mg(ClO_4)_2$ and $Mg(OOC_2H_5)_2$.

The amount of the electrolyte salt (II) depends on factors such as the required current density, the applications, and the kind of the electrolyte salt. The amount is preferably not less than 0.1 parts by mass, more preferably not less than 1 part by mass, and particularly preferably not less than 5 parts by mass, and is preferably not more than 200 parts by mass, more preferably not more than 100 parts by mass, and particularly preferably not more than 50 parts by mass, per 100 parts by mass of the solvent (I) for dissolving an electrolyte salt.

The electrolytic solution of the present invention is prepared by dissolving the electrolyte salt (II) in the solvent (I) for dissolving an electrolyte salt.

The electrolytic solution of the present invention may be combined with a polymer material that dissolves or swells in the solvent of the electrolytic solution of the present invention so as to be in a (plasticized) gel form.

Examples of such polymer materials include conventionally known polyethylene oxide, polypropylene oxide and modified compounds thereof (JP-A H08-222270, JP-A 2002-100405); polyacrylate polymers, polyacrylonitrile, and fluorine-containing resins such as polyvinylidene fluoride and vinylidene fluoride-hexafluoropropylene copolymers (JP-T H04-506726, JP-T H08-507407, JP-A H10-294131); and complexes of these fluorine-containing resins with hydrocarbon resins (JP-A H11-35765, JP-A H11-86630). In particular, polyvinylidene fluoride and vinylidene fluoride-hexafluoropropylene copolymers are preferably used as polymer materials for the gel electrolytic solution.

Alternatively, ion-conducting compounds disclosed in JP-A 2006-114401 may be used.

These ion-conducting compounds are non-crystalline fluorine-containing polyether compounds that contain a fluorine-containing group in a side chain and are represented by the formula (1-1):

$$P\text{-}(D)\text{-}Q \qquad (1\text{-}1)$$

wherein D is represented by the formula (2-1):

$$\text{-}(D1)_n\text{-}(FAE)_m\text{-}(AE)_p\text{-}(Y)_q\text{-} \qquad (2\text{-}1)$$

wherein D1 represents an ether unit containing a fluorine-containing ether group in its side chain and is represented by the formula (2a):

wherein Rf represents a fluorine-containing ether group optionally containing a crosslinkable functional group, and $R^{15}$ represents a group or bond linking Rf to the trunk chain, FAE represents an ether unit containing a fluoroalkyl group in its side chain and is represented by the formula (2b):

wherein Rfa represents a hydrogen atom or a fluoroalkyl group optionally containing a crosslinkable functional group, and $R^{16}$ represents a group or bond linking Rfa to the trunk chain, AE represents an ether unit represented by the formula (2c):

wherein $R^{18}$ represents a hydrogen atom, an alkyl group optionally containing a crosslinkable functional group, an aliphatic cyclic hydrocarbon group optionally containing a crosslinkable functional group, or an aromatic hydrocarbon group optionally containing a crosslinkable functional group, and $R^{17}$ represents a group or bond linking $R^{18}$ to the trunk chain, Y represents a unit containing at least one of the groups represented by the formulae (2d-1) to (2d-3):

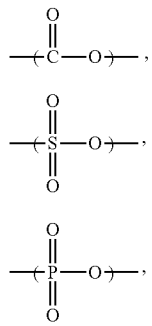

n represents an integer of 0 to 200, m represents an integer of 0 to 200, p represents an integer of 0 to 10,000, q represents an integer of 1 to 100, n+m is not 0, and the arrangement of D1, FAE, AE and Y is not specified; and P and Q may be the same as or different from each other and each represent a hydrogen atom, an alkyl group optionally containing a fluorine atom and/or a crosslinkable functional group, a phenyl group optionally containing a fluorine atom and/or a crosslinkable functional group, —COOH, —OR$^{19}$ in which R$^{19}$ is a hydrogen atom or an alkyl group optionally containing a fluorine atom and/or a crosslinkable functional group, an ester group or a carbonate group (when the end of D is an oxygen atom, P and Q are not —COOH, —OR$^{19}$, an ester group and a carbonate group).

The electrolytic solution of the present invention may optionally contain other additives. Examples of other additives include metal oxides and glass.

Preferably, the electrolytic solution of the present invention will neither freeze nor give a precipitate of the electrolyte salt even at low temperatures (for example, at 0° C. and −20° C.). Specifically, the electrolytic solution of the present invention has a viscosity at 0° C. of preferably not higher than 100 mPa·s, more preferably not higher than 30 mPa·s, and particularly preferably not higher than 15 mPa·s, and has a viscosity at −20° C. of preferably not higher than 100 mPa·s, more preferably not higher than 40 mPa·s, and particularly preferably not higher than 15 mPa·s.

The electrolytic solution having such characteristics is useful as an electrolytic solution for electric double layer capacitors because the flame retardance, low-temperature characteristics, solvency for electrolyte salts and compatibility with hydrocarbon solvents are all improved and also because the electrolytic solution exhibits stable characteristics at a withstand voltage of higher than 3.5 V, or even at a withstand voltage of higher than 4.0 V.

In the electric double layer capacitor of the present invention, at least one of the positive electrode and the negative electrode is a polarizable electrode. The following electrodes, which are specifically described in JP-A H09-7896, may be used as polarizable and non-polarizable electrodes.

The polarizable electrode used in the present invention may be one mainly made of activated carbon and preferably containing inactivated carbon having a large specific surface area and a conductive material capable of imparting electronic conductivity, such as carbon black. This polarizable electrode can be prepared by various methods. For example, a polarizable electrode including activated carbon and carbon black can be prepared by mixing activated carbon powder, carbon black and phenol resin; and subjecting the mixture to press-molding and then to sintering in an inert gas atmosphere and activation in a steam atmosphere.

Preferably, the polarizable electrode is bonded to a current collector with, for example, a conductive adhesive.

Alternatively, the polarizable electrode can be formed by kneading activated carbon powder, carbon black and a binder in the presence of an alcohol; molding the mixture into a sheet; and drying the molded sheet. Examples of the binder include polytetrafluoroethylene. The polarizable electrode may also be incorporated with a current collector by mixing activated carbon powder, carbon black, a binder and a solvent to give a slurry; applying this slurry to a metallic foil as a current collector; and drying the coat.

In the electric double layer capacitor, both the electrodes may be polarizable electrodes mainly made of activated carbon. Alternatively, one of the electrodes may be a non-polarizable electrode. In this case, for example, a polarizable electrode mainly made of activated carbon may be used as a negative electrode in combination with a positive electrode mainly made of an active material (e.g. a metal oxide), or may be used in combination with a negative electrode mainly made of a carbon material that is capable of reversibly occluding and releasing lithium ions or a negative electrode of a lithium metal or a lithium alloy.

In addition, carbonaceous materials such as carbon black, graphite, expansive graphite, porous carbon, carbon nanotube, carbon nanohorn and Ketjen black may be used instead of or in combination with activated carbon.

Preferably, the non-polarizable electrode is mainly made of a carbon material capable of reversibly occluding and releasing lithium ions. Such an electrode is used after lithium ions are occluded in the carbon material. In this case, the electrolyte is a lithium salt. The electric double layer capacitor having this structure achieves a higher withstand voltage of exceeding 4 V.

A preferred solvent for preparing a slurry used for production of an electrode is a solvent capable of dissolving a binder, and is appropriately selected from N-methylpyrrolidone, dimethylformamide, toluene, xylene, isophorone, methyl ethyl ketone, ethyl acetate, methyl acetate, dimethyl phthalate, ethanol, methanol, butanol, and water, depending on the kind of a binder to be used.

Examples of activated carbon for the polarizable electrode include phenol resin-based activated carbon, coconut shell-based activated carbon, and petroleum coke-based activated carbon. Among these, petroleum coke-based activated carbon and phenol resin-based activated carbon are preferably used because they increase capacitance. Examples of the activation treatment of activated carbon include steam activation and molten KOH activation. Activated carbon obtained by molten KOH activation is preferably used because it increases capacitance.

Examples of a preferred conductive material for the polarizable electrode include carbon black, Ketjen black, acetylene black, natural graphite, artificial graphite, metallic fibers, conductive titanium oxide, and ruthenium oxide. The amount of a conductive material such as carbon black used in the polarizable electrode is preferably 1 to 50, by mass based on the total amount of the conductive material and activated carbon. This is for the purpose of achieving satisfactory conductivity (low internal resistance) and also because an excessively high content of the conductive material decreases the capacitance of a product.

In order to produce an electric double layer capacitor with larger capacitance and lower internal resistance, activated carbon for the polarizable electrode is preferably one having an average particle size of not more than 20 μm and a specific surface area of 1500 to 3000 m²/g. Examples of carbon materials that can be preferably used for electrodes mainly made of a carbon material capable of reversibly occluding and releasing lithium ions include natural graphite, artificial graphite, graphitized mesocarbon particles, graphitized whiskers, vapor grown carbon fibers, calcined products of furfuryl alcohol resins, and calcined products of novolak resins.

Any current collectors can be used as long as they are resistant to chemical and electrochemical corrosion. Preferred examples of a current collector for a polarizable electrode mainly made of activated carbon include current collectors of stainless steel, aluminum, titanium, or tantalum. Among these, stainless steel and aluminum are particularly preferable materials in both terms of characteristics of the resulting electric double layer capacitor and costs. Preferred examples of a current collector for an electrode mainly made of a carbon material capable of reversibly occluding and releasing lithium ions include current collectors of stainless steel, copper or nickel.

Lithium ions are preliminarily occluded in the carbon material capable of reversibly occluding and releasing lithium ions, for example, by the following methods: (1) by preliminarily mixing lithium powder with the carbon material capable of reversibly occluding and releasing lithium ions; (2) by mounting a lithium foil on an electrode made of a binder and the carbon material capable of reversibly occluding and releasing lithium ions, and immersing the electrode in an electrolytic solution containing a lithium salt dissolved therein while maintaining electrical contact between the lithium foil and the electrode, so that lithium is ionized and taken into the carbon material; and (3) by immersing a lithium metal placed on the positive side and an electrode made of a binder and the carbon material capable of reversibly occluding and releasing lithium ions which is placed on the negative side in a non-aqueous electrolytic solution containing a lithium salt as an electrolyte, and applying a current such that lithium is electrochemically taken into the carbon material, in an ionized form.

The electrolytic solution of the present invention is useful for various electrochemical devices provided with an electrolytic solution as well as for electric double layer capacitors. Examples of electrochemical devices include lithium secondary batteries, radical batteries, solar cells (especially, dye-sensitized solar cells), fuel cells, various electrochemical sensors, electrochromic devices, electrochemical switching devices, aluminum electrolytic capacitors, and tantalum electrolytic capacitors. In particular, the electrolytic solution of the present invention is suitable for lithium secondary batteries. The electrolytic solution of the present invention can also be used as, for example, an ionic conductor for an antistatic coating material.

EXAMPLES

Hereinafter, the present invention is described by way of the following non-limiting Examples and Comparative Example.

In the present invention, evaluation was performed as follows.
(Withstand Voltage)
Each of the electrolytic solutions prepared in Examples and Comparative Example was set in a three-electrode voltage measuring cell (HS cell available from Hohsen Corp., working and counter electrodes:platinum (area ratio (counter electrode:working electrode) is 5:1), reference electrode:Pt), and was subjected to a potential scan at 5 mV/sec with a potentiostat to determine the decomposition current.
(Cycle Characteristics)

Activated carbon (100 parts by mass, specific surface area: 1800 to 2300 m²/g), acetylene black (3 parts by mass), Ketjen black (2 parts by mass), an elastomer binder (4 parts by mass (solids content)), and a dispersant (2 parts by mass), and optionally water were mixed, and the mixture was kneaded with a stirrer into a slurry for electrodes.

This slurry for electrodes was applied to an aluminum current collector coated with a conductive paste, and then was dried at 110° C. to form an 80 μm thick electrode which was then processed into a rectangular electrode.

Rectangular electrodes thus produced and a laminated casing were subjected to heat treatment under reduced pressure to remove moisture, and a laminated cell was prepared in a dry atmosphere. Here, a nonwoven fabric of polypropylene fibers was used as a separator.

This laminated cell was charged at 30 mA up to 3.3 V, and after maintaining this voltage for five minutes, was discharged at 30 mA. This procedure was counted as one cycle, and this charging and discharging cycle was repeated.

The capacitance and internal resistance in an initial state (in the 5th cycle) and in the 150th cycle were determined in accordance with a measuring method JEITA RC 2377 (Japan Electronics and Information Technology Industries Association). The capacitance degradation ratio and internal resistance increase ratio in the 150th cycle were calculated using the following equations.

Capacitance degradation ratio=(capacitance in 150th cycle/capacitance in 5th cycle)

Internal resistance increase ratio=(internal resistance in 150th cycle/internal resistance in 5th cycle)

(Measurement Conditions in JEITA RC 2377)
Power supply voltage (V): 3.3
Discharge current (mA): capacitance (F)×10

Example 1

A solvent for dissolving an electrolyte salt was prepared by mixing propylene carbonate and $CF_3CF_2CH_2OCOOCH_2CF_2CF_2H$ at a volume ratio of 50/50. To this solvent for dissolving an electrolyte salt was added triethylmethylammonium tetrafluoroborate ($TEMABF_4$) to a concentration of 1 mole/liter. The salt was uniformly dissolved. The resulting solution was evaluated as an electrolytic solution by the tests described above. Table 1 shows the results.

Example 2

A solvent for dissolving an electrolyte salt was prepared by mixing propylene carbonate and $CH_3OCOOCH_2CF_3$ at a volume ratio of 50/50. To this solvent for dissolving an electrolyte salt was added $TEMABF_4$ to a concentration of 1 mole/liter. The salt was uniformly dissolved. The resulting solution was evaluated as an electrolytic solution by the tests described above. Table 1 shows the results.

Example 3

A solvent for dissolving an electrolyte salt was prepared by mixing propylene carbonate and $HCF_2CF_2CH_2OCF_2CF_2H$ at a volume ratio of 50/50. To this solvent for dissolving an electrolyte salt was added spiro-bipyrrolidinium tetrafluoroborate to a concentration of 1 mole/liter. The salt was uniformly dissolved. The resulting solution was evaluated as an electrolytic solution by the tests described above. Table 1 shows the results.

Example 4

A solvent for dissolving an electrolyte salt was prepared by mixing propylene carbonate and $HCF_2CF_2CH_2OCF_2CFHCF_3$ at a volume ratio of 50/50. To this solvent for dissolving an electrolyte salt was added spiro-bipyrrolidinium tetrafluoroborate to a concentration of 1 mole/liter. The salt was uniformly dissolved. The resulting solution was evaluated as an electrolytic solution by the tests described above. Table 1 shows the results.

Example 5

A solvent for dissolving an electrolyte salt was prepared by mixing propylene carbonate and $HCF_2CF_2CH_2OCF_2CF_2H$ at a volume ratio of 30/70. To this solvent for dissolving an electrolyte salt was added spiro-bipyrrolidinium tetrafluoroborate to a concentration of 1 mole/liter. The salt was uniformly dissolved. The resulting solution was evaluated as an electrolytic solution by the tests described above. Table 1 shows the results.

Example 6

A solvent for dissolving an electrolyte salt was prepared by mixing propylene carbonate and $HCF_2CF_2CH_2OCF_2CF_2H$ at a volume ratio of 70/30. To this solvent for dissolving an electrolyte salt was added spiro-bipyrrolidinium tetrafluoroborate to a concentration of 1 mole/liter. The salt was uniformly dissolved. The resulting solution was evaluated as an electrolytic solution by the tests described above. Table 1 shows the results.

Example 7

A solvent for dissolving an electrolyte salt was prepared by mixing propylene carbonate and $HCF_2CF_2CH_2OCF_2CF_2H$ at a volume ratio of 30/70. To this solvent for dissolving an electrolyte salt was added $TEMABF_4$ to a concentration of 1 mole/liter. The salt was uniformly dissolved. The resulting solution was evaluated as an electrolytic solution by the tests described above. Table 1 shows the results.

Example 8

A solvent for dissolving an electrolyte salt was prepared by mixing propylene carbonate and $HCF_2CF_2CH_2OCF_2CF_2H$ at a volume ratio of 70/30. To this solvent for dissolving an electrolyte salt was added $TEMABF_4$ to a concentration of 1 mole/liter. The salt was uniformly dissolved. The resulting solution was evaluated as an electrolytic solution by the tests described above. Table 1 shows the results.

Example 9

A solvent for dissolving an electrolyte salt was prepared by mixing propylene carbonate and $HCF_2CF_2CH_2OCF_2CFHCF_3$ at a volume ratio of 30/70. To this solvent for dissolving an electrolyte salt was added tetraethylammonium tetrafluoroborate ($TEABF_4$) to a concentration of 1 mole/liter. The salt was uniformly dissolved. The resulting solution was evaluated as an electrolytic solution by the tests described above. Table 1 shows the results.

Example 10

A solvent for dissolving an electrolyte salt was prepared by mixing propylene carbonate and $HCF_2CF_2CH_2OCF_2CFHCF_3$ at a volume ratio of 70/30. To this solvent for dissolving an electrolyte salt was added $TEABF_4$ to a concentration of 1 mole/liter. The salt was uniformly dissolved. The resulting solution was evaluated as an electrolytic solution by the tests described above. Table 1 shows the results.

Comparative Example 1

$TEMABF_4$ was added to propylene carbonate to a concentration of 1 mole/liter. The salt was uniformly dissolved. The resulting solution was evaluated as an electrolytic solution by the tests described above. Table 1 shows the results.

TABLE 1

|  | Example | | | | | | | | | | Comparative Example |
|---|---|---|---|---|---|---|---|---|---|---|---|
|  | 1 | 2 | 3 | 4 | 5 | 6 | 7 | 8 | 9 | 10 | 1 |
| Electrolytic solution Solvent (I) (% by volume) | | | | | | | | | | | |
| PC | 50 | 50 | 50 | 50 | 30 | 70 | 30 | 70 | 30 | 70 | 100 |
| $CF_3CF_2CH_2OCOOCH_2CF_2CF_2H$ | 50 | — | — | — | — | — | — | — | — | — | — |
| $CH_3OCOOCH_2CF_3$ | — | 50 | — | — | — | — | — | — | — | — | — |
| $HCF_2CF_2CH_2OCF_2CF_2H$ | — | — | 50 | — | 70 | 30 | 70 | 30 | — | — | — |
| $HCF_2CF_2CH_2OCF_2CFHCF_3$ | — | — | — | 50 | — | — | — | — | 70 | 30 | — |
| Electrolyte salt (II) (M/liter) | | | | | | | | | | | |
| $TEMABF_4$ | 1 | 1 | — | — | — | — | 1 | 1 | — | — | 1 |
| Spirobipyrrolidinium tetrafluoroborate | — | — | 1 | 1 | 1 | 1 | — | — | — | — | — |
| $TEABF_4$ | — | — | — | — | — | — | — | — | 1 | 1 | — |
| Withstand voltage (V) | 3.3 | 3.3 | 3.3 | 3.3 | 3.3 | 3.3 | 3.3 | 3.3 | 3.3 | 3.3 | 3.3 |
| Cycle characteristic (resistance increase ratio) | 1.0 | 1.0 | 1.0 | 1.0 | 1.0 | 1.0 | 1.0 | 1.0 | 1.0 | 1.0 | 1.0 |
| Cycle characteristic (resistance increase ratio) | 1.1 | 1.3 | 1.3 | 1.3 | 1.3 | 1.5 | 1.1 | 1.2 | 1.2 | 1.2 | 1.8 |

The results shown in Table 1 indicate that a longer lifetime was achieved (the cycle characteristics were improved) while a large capacitance (a high withstand voltage) was maintained.

The invention claimed is:

1. An electrolytic solution for an electric double layer capacitor, comprising:
   (I) a solvent for dissolving an electrolyte salt; and
   (II) an electrolyte salt,
   wherein the solvent (I) for dissolving an electrolyte salt includes propylene carbonate and (Ib) a fluorine-containing chain ether,
   the fluorine-containing chain ether (Ib) is $HCF_2CF_2CH_2OCF_2CF_2H$ and/or $HCF_2CF_2CH_2OCF_2CFHCF_3$,
   the volume ratio of the propylene carbonate to the fluorine-containing chain carbonate and/or the fluorine-containing chain ether is 5/95 to 95/5, and
   the electrolyte salt (II) is a tetraalkyl ammonium salt, a spiro-bipyrrolidinium salt, or an imidazolium salt.

2. An electric double layer capacitor comprising:
   the electrolytic solution according to claim 1;
   a positive electrode; and
   a negative electrode.

* * * * *